Patented Jan. 4, 1938

2,104,069

UNITED STATES PATENT OFFICE 2,104,069

PROCESS FOR TREATMENT OF SOLUTIONS OF CHLORINATED RUBBER

John Philip Baxter, Widnes, Terence Neil Montgomery, Lancaster, and Joseph Grange Moore, Runcorn, England, assignors to Imperial Chemical Industries Limited, a corporation of Great Britain No Drawing. Application December 23, 1935, Serial No. 55,936. In Great Britain December 27, 1934

6 Claims. (Cl. 134—17)

This invention relates to a process for the treatment of solutions of chlorinated rubber, and more particularly for reducing the viscosity of such solutions.

It has been realized for some time that the viscosity of solutions of chlorinated rubber plays an important part in the successful application of the material to commercial purposes, the use of solutions combining a relatively high chlorinated rubber content with low viscosity being in many cases essential. Although it is known that the viscosity of a given solution can be reduced by appropriate treatment, manufacturing processes often furnish batches of chlorinated rubber solution which vary widely in viscosity. Further, considerable difficulty has been experienced in preparing a low viscosity product by methods which are sufficiently quick for commercial use. Processes which have hitherto been used have involved physical or chemical treatment of the rubber prior to or simultaneously with the chlorination, or have necessitated a lengthy ageing with or without irradiation of the chlorinated solution by exposure to a source of active rays.

According to the present invention the viscosity of a solution of chlorinated rubber is reduced by subjecting the solution to violent mechanical treatment producing shearing stresses within the solution.

A method of dispersing pigments in chlorinated rubber or other vehicle which involves subjecting the mix to high shearing stresses has already been described, but such treatment was confined to materials which, if rolled into sheets of appropriate thickness possessed the general physical texture or consistency of sole leather. The present invention, however, is concerned only with solutions of chlorinated rubber in carbon tetrachloride, benzene, or other solvent in which the solvent is in substantial excess. While such solutions may possess very high viscosity they do not possess a consistency which permits them to be rolled into sheets.

One method of performing our invention is to pass the solution, under pressure if desired, through a homogenizer or a colloid mill, or through a high speed milling machine normally used for incorporating powders of extreme fineness, e. g. a paste mill. The solution may, if desired, be passed several times through the same apparatus, each passage effecting a further reduction in viscosity; however, we find that with successive treatments the extent of the decrease in viscosity which is brought about diminishes rapidly, and after two or three passages, depending upon individual circumstances, little advantage is to be gained by continuing the procedure. The mechanical treatment is accompanied by a considerable development of heat which is liable to cause loss of solvent by evaporation, and consequently deposition of solid chlorinated rubber within the apparatus, and for this reason we prefer to prevent overheating of the apparatus by using water or other cooling system.

As a further feature of the invention other methods of reducing the viscosity of a chlorinated rubber solution may be combined with the violent mechanical treatment, for example, the solution may be subjected to a preliminary or subsequent ageing, with or without exposure to light.

Solutions of any concentration may be treated by our process, though the precise type of machine to be employed to effect the reduction must be chosen in accordance with the initial viscosity of the solution to be treated. Thus, solutions having a viscosity of not more than about 25 poises are conveniently treated directly in a high speed paste mill with a separation of rotor and stator of 1 to 3 thousandths of an inch; solutions having a greater viscosity, e. g. up to 50-60 poises can also be treated in such apparatus, but the output of a given mill decreases rapidly as the viscosity approaches such value, and it is therefore better to effect the reduction in stages. For example, a preliminary reduction of viscosity can be effected using a greater separation of rotor and stator than is required for the final stage. Alternatively, different types of mill may be utilized for the different stages. In this manner it is possible to treat a solution having an initial viscosity of 500 poises or more. We find, however, that the most satisfactory method of dealing with such highly viscous solutions is to effect a preliminary reduction in viscosity to say 20–30 poises by photochemical treatment or other known method, and then to bring about the final reduction of the viscosity down to the required figure by the use of violent mechanical treatment. A great economy of time is still realized by this procedure since it is the latter stages of an ageing or similar treatment which are so protracted.

The following examples illustrate specific methods of carrying out our invention, the viscosities being determined at 25° C.

Example 1

A solution of chlorinated rubber in carbon tetrachloride containing 10% by weight and having a viscosity of 35 poises, was passed through a narrow gap between two circular plates, one fixed and the other rotating at a speed of 9000 R. P. M., the width of the gap being 1-2 thousandths of an inch. After one passage of the solution through this apparatus, the viscosity was reduced to 7 poises. Subsequent passages produced further reductions in viscosity.

*Example 2*

A 40% solution of chlorinated rubber in toluene was passed through a hand operated homogenizer, whereby 36% reduction in viscosity resulted.

*Example 3*

A solution of chlorinated rubber in carbon tetrachloride containing 200 grams/litre of chlorinated rubber and having a viscosity of 80 poises was allowed to age for 15 hours, when the viscosity had fallen to 30 poises. The solution was then passed through a water-cooled paste mill in which rotor and stator were separated by .002 inch; the rotor revolving at 9000 R. P. M. the viscosity was reduced to 7.4 poises, and on a second passage through the same mill the viscosity was reduced to 5 poises.

We claim:

1. Process for the treatment of chlorinated rubber solutions for the purpose of reducing their viscosity which comprises subjecting them to a violent mechanical treatment producing shearing stresses within the solution.

2. The process of treating carbon tetrachloride solutions of chlorinated rubber for the purpose of reducing their viscosity which comprises passing them through a homogenizer or colloid mill.

3. Process for the treatment of chlorinated rubber solutions for the purpose of reducing their viscosity which comprises subjecting them to a violent mechanical treatment producing shearing stresses within the solution and also to an ageing treatment of known kind which may if desired include exposure to light.

4. The process of treating carbon tetrachloride solutions of chlorinated rubber for the purpose of reducing their viscosity which comprises ageing the solutions until their viscosity has been reduced and then passing the resultant through a homogenizer or colloid mill.

5. The viscosity reduction process which comprises passing a 10% solution of chlorinated rubber in carbon tetrachloride through a colloid mill having a gap of .002 inch while maintaining a speed differential of 9000 revolutions per minute between the circular plates defining the gap.

6. The process which comprises subjecting a carbon tetrachloride solution of chlorinated rubber to a mechanical treatment sufficiently drastic to cause shearing stresses within the solution.

JOHN PHILIP BAXTER.
TERENCE NEIL MONTGOMERY.
JOSEPH GRANGE MOORE.